US00RE42486E

(19) United States
(12) Reissued Patent
Peled et al.

(10) Patent Number: US RE42,486 E
(45) Date of Reissued Patent: Jun. 28, 2011

(54) PRECIOUS STONE

(75) Inventors: Shraga Peled, Ramat Gan (IL); Efraim Aloof, Netanya (IL)

(73) Assignee: Peled Diamonds Ltd., Ramat Gan (IL)

() Term: 14 Years**

(21) Appl. No.: 29/338,342

(22) Filed: Jun. 9, 2009

Related U.S. Patent Documents

Reissue of:

(64) Patent No.: Des. 574,288
Issued: Aug. 5, 2008
Appl. No.: 29/277,435
Filed: Feb. 26, 2007

(30) Foreign Application Priority Data

Aug. 31, 2006 (CH) ..... 133201

(51) LOC (9) Cl. ..... 11-01
(52) U.S. Cl. ..... D11/90
(58) Field of Classification Search ..... D11/1–2, D11/26–29, 89–92; 63/26–28, 32
See application file for complete search history.

(56) References Cited

U.S. PATENT DOCUMENTS

| | | | | | |
|---|---|---|---|---|---|
| D262,200 | S | * | 12/1981 | Kirwan | D11/90 |
| D276,143 | S | * | 10/1984 | Williams | D11/121 |
| D372,883 | S | * | 8/1996 | Adler | D11/89 |
| D373,971 | S | * | 9/1996 | Katz | D11/90 |
| D384,593 | S | * | 10/1997 | Katz | D11/90 |
| D392,590 | S | * | 3/1998 | Bachar | D11/90 |
| D402,913 | S | * | 12/1998 | Katz | D11/90 |
| D462,634 | S | * | 9/2002 | Cohen | D11/90 |
| D465,431 | S | * | 11/2002 | Kanner | D11/90 |
| D501,423 | S | * | 2/2005 | Tolkowsky | D11/90 |

* cited by examiner

*Primary Examiner* — Ralf Seifert
(74) *Attorney, Agent, or Firm* — Fennemore Craig, P.C.

(57) CLAIM

The ornamental design for a precious stone, as shown and described.

DESCRIPTION

FIG. 1 is top plan view of a precious stone showing my new design;
FIG. 2 is a bottom plan view;
FIG. 3 is a front elevational view;
FIG. 4 is a rear elevational view;
FIG. 5 is side elevational view; and,
FIG. 6 is a bottom perspective view.

1 Claim, 6 Drawing Sheets

Figure 1:
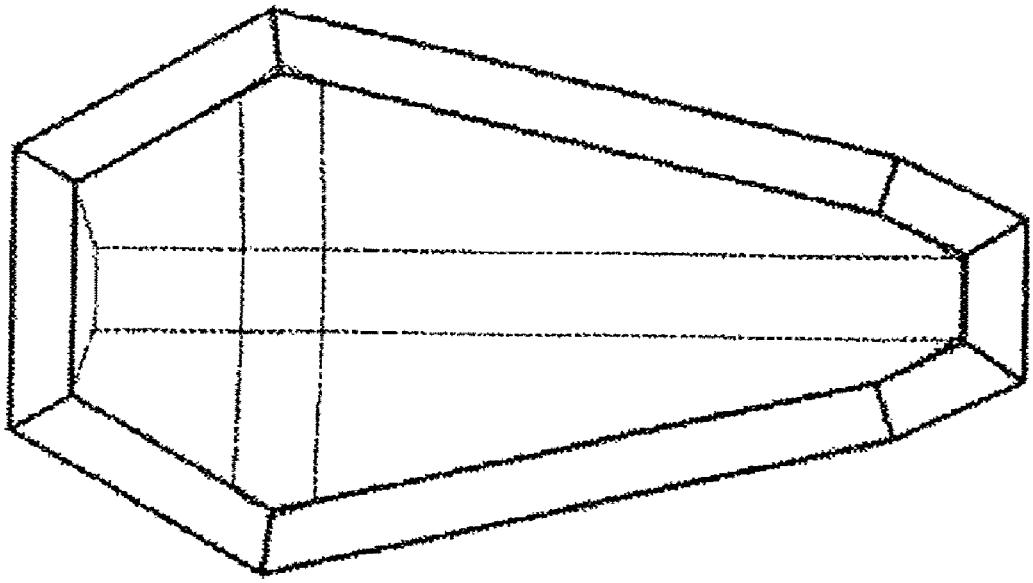
Figure 2:
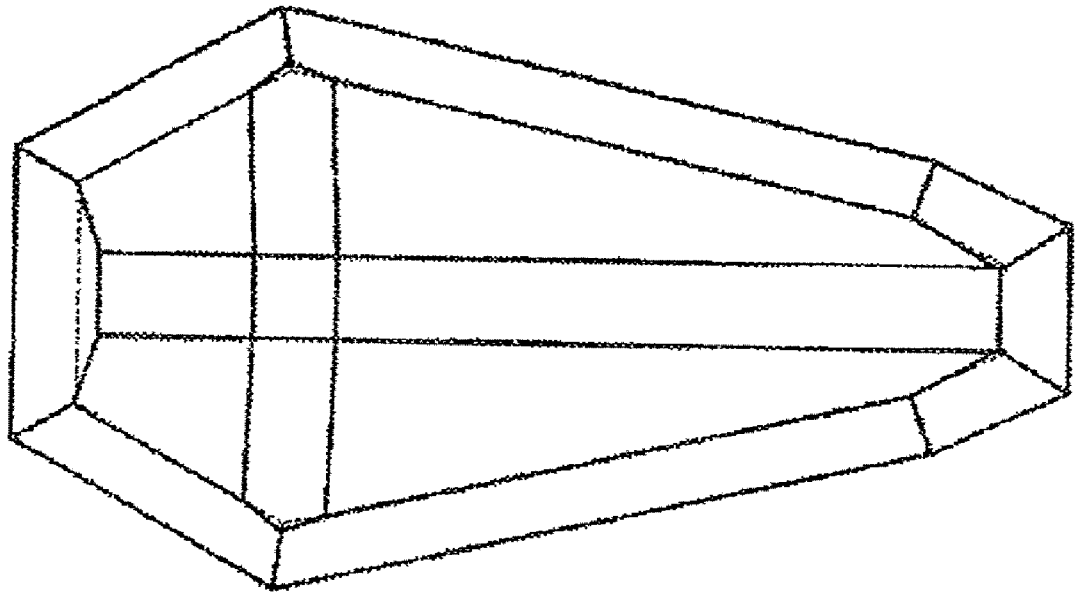
Figure 3:
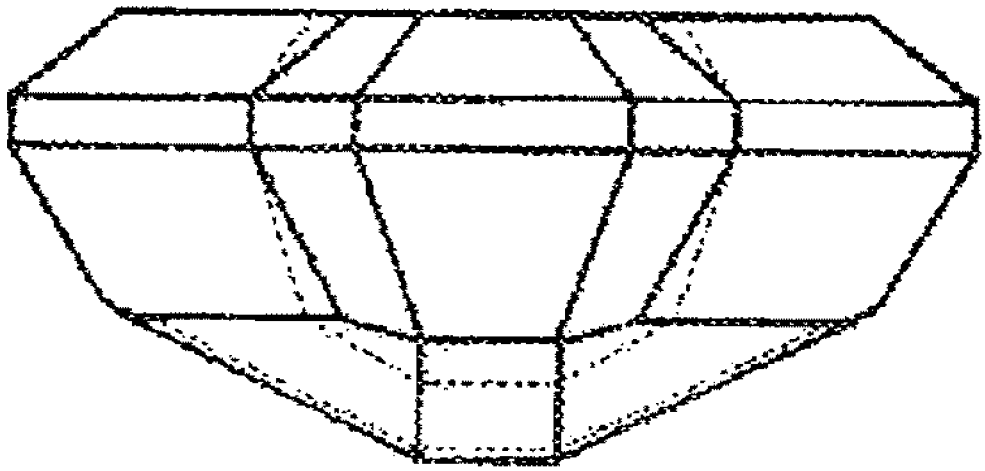
Figure 4:
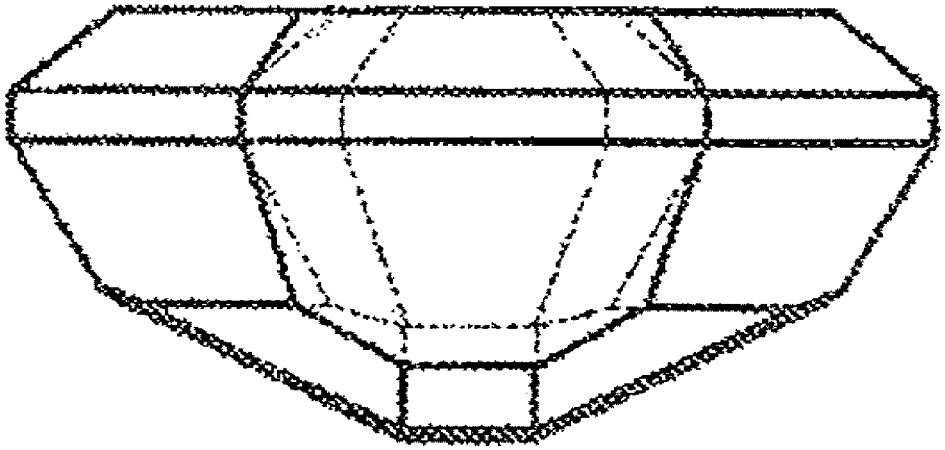
Figure 5:
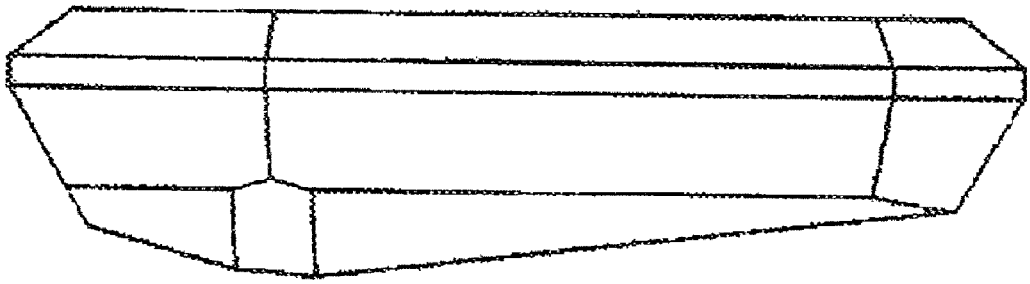
Figure 6:
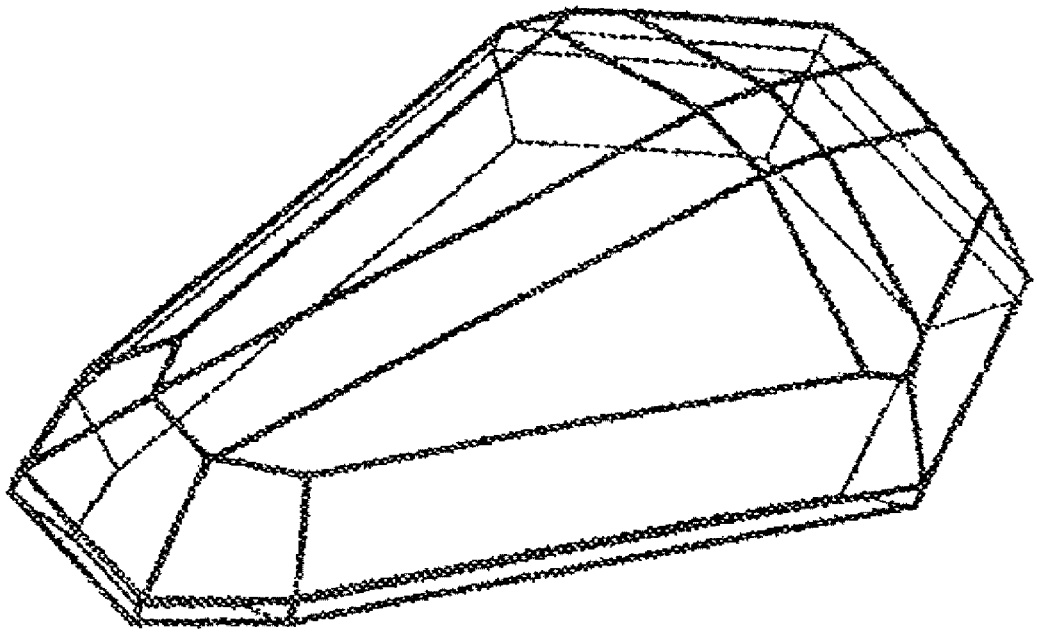

Matter enclosed in heavy brackets [ ] appears in the original patent, but forms no part of this reissue; matter printed in italics indicates the additions made by reissue.